United States Patent [19]
Levy et al.

[11] Patent Number: 5,748,744
[45] Date of Patent: May 5, 1998

[54] SECURE MASS STORAGE SYSTEM FOR COMPUTERS

[75] Inventors: Paul S. Levy; Steve Cornelius, both of Chandler, Ariz.

[73] Assignee: VLSI Technology, Inc., San Jose, Calif.

[21] Appl. No.: 657,826

[22] Filed: Jun. 3, 1996

[51] Int. Cl.$^6$ ..................................................... H04L 9/00
[52] U.S. Cl. ........................................ 380/52; 380/4
[58] Field of Search ............................... 380/4, 25, 52

[56] References Cited

U.S. PATENT DOCUMENTS 5,282,247  1/1994  McLean et al. .......................... 380/4
5,375,243  12/1994  Parzych et al. ........................... 380/4
5,377,269  12/1994  Heptig et al. ............................. 380/4

*Primary Examiner*—David C. Cain
*Attorney, Agent, or Firm*—Harry M. Weiss & Associates, P.C.; Harry M. Weiss; Jeffrey D. Moy

[57] ABSTRACT

The present invention relates to a system and method for securing sensitive data on mass storage devices. The system and method use an encryption device to encrypt sensitive data that is to be stored on the mass storage devices. A plurality of cryptographic keys are provided to ensure that only authorized personnel have the ability to access the encrypted data.

19 Claims, 2 Drawing Sheets

SECURE MASS STORAGE SYSTEM FOR COMPUTERS

BACKGROUND OF THE INVENTION

1. Field of the Invention

This invention relates generally to computer systems and, more specifically, to a system and method for securing sensitive data stored on mass storage devices. The system encrypts the data to be secured and provides a plurality of keys which only allows authorized personnel to read and decrypt the secured data.

2. Description of the Prior Art

Data security has always been a major concern for the computer industry. The growth of sensitive information maintained in electronic form is growing at an exponential rate. Growth of reasonable and affordable high speed networks has compounded the problem. Consequently, the owners of sensitive information continue to become increasingly concerned about the security of their intellectual property.

Technology to alleviate the security problem is only now becoming available at reasonable cost. Unfortunately, standards to support the implementation and market acceptance of security technology are lagging behind. Until well accepted standards exist, market resistance to the incorporation of security technologies will continue to persist.

Therefore a need existed to provide a system and method for securing sensitive data contained upon mass storage media. The system and method must provide a low cost mechanism for securing media resident data that poses a minimum possible impact to the end user who is already familiar and comfortable with accepted peripheral types, operating systems, and off the shelf applications. Thus, the system and method maintain the particular notion that any file security technology, no matter how safe, will be avoided by the end user unless it can be implemented as transparently as possible to the user's normal course of operation.

SUMMARY OF THE INVENTION

In accordance with one embodiment of the present invention, it is an object of the present invention to create a rational standard for the selective encryption of sensitive data on a computer system.

It is another object of the present invention to provide a system and method which provides a low cost mechanism for selectively securing media resident data.

It is still another object of the present invention to provide a system and method which provides a low cost mechanism for selectively securing media resident data that poses a minimum possible impact to the end user who is already familiar and comfortable with accepted operating systems and off the shelf applications.

BRIEF DESCRIPTION OF THE PREFERRED EMBODIMENTS

In accordance with one embodiment of the present invention, a secure mass storage system is disclosed. The secured mass storage system is comprised of a Central Processing Unit (CPU) system. Mass storage means are coupled to the CPU system for storing and transferring encrypted and non-encrypted data to and from the CPU system. Peripheral control logic means are coupled to the mass storage means for reading the encrypted and non-encrypted data stored on the mass storage means. Peripheral controller means are coupled to the peripheral control logic means for accessing the mass storage means. Cryptographic means are coupled to the peripheral controller means for encrypting data to be stored on the mass storage means and for decrypting encrypted data stored on the mass storage means to be used by the CPU system. Bus controller means are coupled to the peripheral controller means and to the CPU system for selecting a bus for transferring the encrypted and non-encrypted data to and from the mass storage means. Operating system means are programmably stored in the CPU system for providing a command set for operation of the CPU system. User supplied key means are programmably stored in the operating system means for accessing the encrypted data stored on the mass storage means. Cipher utility means are programmably stored in the operating system means for providing a command set extension to the command set of the operating system means for initializing the mass storage means to store encrypted data transferred from the cryptographic means, allowing selection of a keyphrase during initialization of the mass storage means, and for allowing a user of the system to input the keyphrase to unlock the user supplied key means for accessing the encrypted data stored on the mass storage means. The secure mass storage system may further comprise media key means stored on the mass storage means for securing the encrypted data stored on the mass storage means; and controller key means stored on the peripheral controller means for allowing the peripheral controller to unlock the media key means and to read the encrypted data stored on the mass storage means after the keyphrase is verified by the peripheral control unit.

In accordance with another embodiment of the present invention, a method for providing a secure mass storage system is disclosed. The method comprises the steps of: providing a secure mass storage system comprising, in combination: a CPU system; mass storage means coupled to the CPU system for storing and transferring encrypted and non-encrypted data to and from the CPU system; peripheral control logic means coupled to the mass storage means for reading the encrypted and non-encrypted data stored on the mass storage means; peripheral controller means coupled to the peripheral control logic means for accessing the mass storage means; cryptographic means coupled to the peripheral controller means for encrypting data to be stored on the mass storage means and for decrypting encrypted data stored on the mass storage means to be used by the CPU system; bus controller means coupled to the peripheral controller means and to the CPU system for selecting a bus for transferring the encrypted and non-encrypted data to and from the mass storage means; operating system means programmably stored in the CPU system for providing a command set for operation of the CPU system; and user supplied key means programmably stored in the operating system means for accessing the encrypted data stored on the mass storage means. The method further includes the steps of: programming cipher utility means stored in the operating system means for providing a command set extension to the command set of the operating system means for initializing the mass storage means to store encrypted data transferred from the cryptographic means, allowing selection of a keyphrase during initialization of the mass storage means, and for allowing a user of the system to input the keyphrase to unlock the user supplied key means for accessing the encrypted data stored on the mass storage means; and selecting a keyphrase during initialization of the mass storage means. The step of providing a secure mass storage system may further comprise the steps of: providing media key means stored on the mass storage means for securing the encrypted data stored on the mass storage means; and providing controller key means stored on the peripheral controller means for allowing the peripheral controller to unlock the media key means and to read the encrypted data stored on the mass storage means after the keyphrase is verified by the peripheral controller means.

The foregoing and other objects, features, and advantages of the invention will be apparent from the following, more particular, description of the preferred embodiments of the invention, as illustrated in the accompanying drawings.

DETAILED DESCRIPTION OF THE PREFERRED EMBODIMENT

Figure 1:
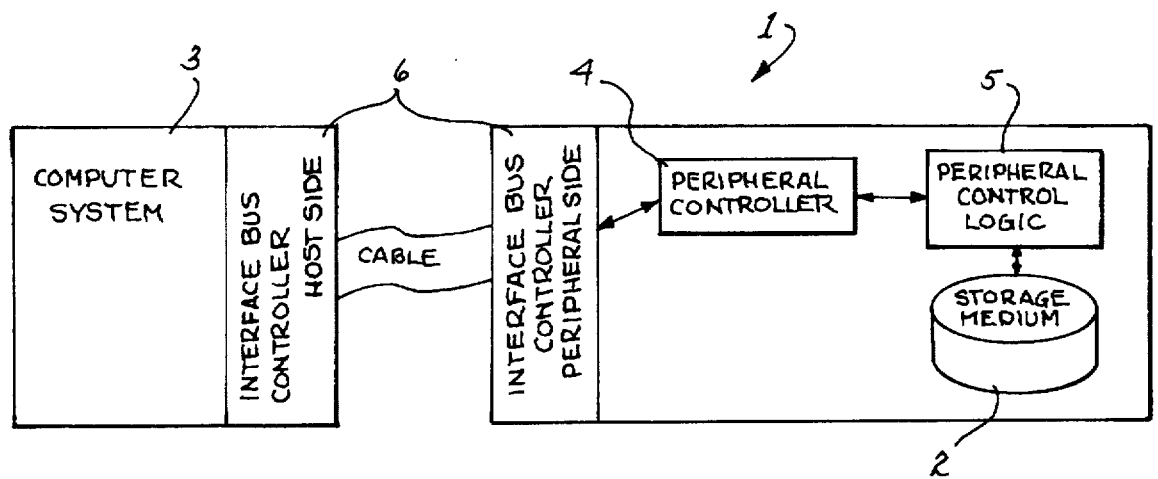
FIG. 1 is a simplified block diagram of a prior art system for storing data in a mass storage device.

Referring to FIG. 1, a prior art system for storing data in a mass storage medium 1 (hereinafter system 1) is shown. The system 1 is comprised of a storage medium 2 which is coupled to a computer system 3. Data is transferred to and read from the storage medium 2 through a peripheral controller 4 and peripheral control logic 5. The problem with the system 1 is that data stored in the storage medium 2 is unsecured. Any individual who uses the system 1 may access information stored on the storage medium 2. Thus, sensitive information stored on the storage medium 2 is freely accessible to anyone who may use the system 1.

Figure 1A:
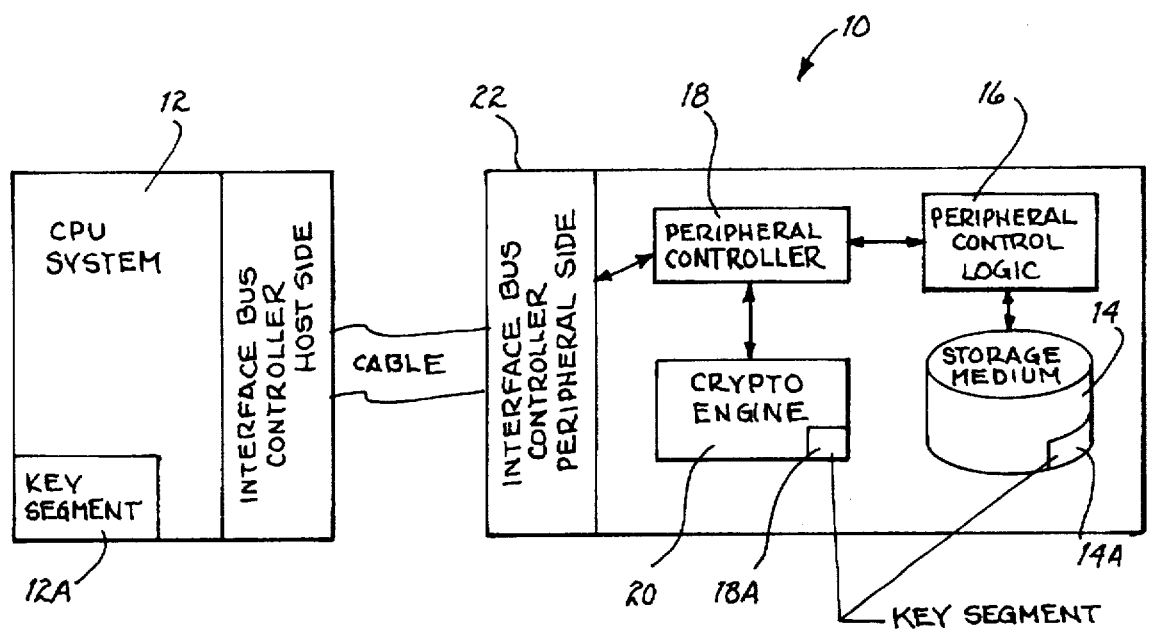
FIG. 1A is a simplified functional block diagram of the secure mass storage system of the present invention.

Referring to FIG. 1A, a secure mass storage system 10 (hereinafter system 10) is shown. Note that in the preferred embodiment of the present invention, the secure mass storage system 10 is packaged as a single, standardized unit. The system 10 is comprised of a Central Processing Unit (CPU) system 12. The CPU system 12 will have at least one mass storage device 14 for storing and transferring data to and from the CPU system 12. The mass storage device 14 can be any permanent mass storage system including, but not limited to, fixed disks (i.e., hard drives), removable disks (i.e., floppy disks), tapes, compact discs (CDs), flash memories, and opticals.

The system 10 is further comprised of peripheral control logic 16. The peripheral control logic is coupled to the mass storage device 14. The peripheral control logic is used for transferring data to the mass storage device 14 and for reading data stored on the mass storage device 14. A peripheral controller 18 is coupled to the peripheral control logic 16. The peripheral controller 18 is used for allowing the CPU system 12 to access the mass storage device 14.

Within the peripheral controller 18 is a cryptographic device 20. The cryptographic device 20 is used for encrypting sensitive data to be stored on the mass storage device 14 and for decrypting encrypted data that was stored on the mass storage device 14 and is to be used by the CPU system 12. The cryptographic device 20 must be reasonably fast in order to prevent peripheral data throughput delays. If necessary, multiple cryptographic devices 20 may be coupled together in parallel in order to improve peripheral data throughput.

The system 10 is further comprised of a bus controller 22. The bus controller 22 is coupled to the peripheral controller 18 and to the CPU system 12. The bus controller 22 is used for selecting a bus for transferring the encrypted and non-encrypted data to and from the mass storage device 14.

In order to provide security for the system 10, at least three cryptographic keys may be used. A controller key 18A will be embedded within the peripheral controller during manufacture. A media key 14A is stored on the mass storage device 14 and is written by the factory during manufacturing. This is done to ensure that the mass storage device 14 is secure from cryptographic attack. If both a controller key 18A and a media key 18A are used, both keys must match in order to read any encrypted data stored on the mass storage device 14. The third key is a user supplied key 12A. The user supplied key 12A is part of a command set extension which will be described below. The user supplied key 12A is a keyphrase supplied by the user at the time the cryptographic functions are enabled on the mass storage device 14. It should be noted that a group access field could be implemented in the user supplied key 12A so that a plurality of people would be authorized to access the encrypted data stored on the mass storage device 14. It should also be noted that the system 10 may be set up with a commercial key escrow means in order to allow an owner of the system 10 to bypass the cryptographic keys in order to access the encrypted data stored on the mass storage devices 14. Commercial key escrow is well known to those in the art and will not be further described.

The system 10 may implement one or all three of the keys described above depending on the type of security needed and the type of mass storage device 14 used. Fixed disks should use all three keys specified above. For fixed disks it is necessary to maintain the highest level of security. Thus, the requirement that the controller key 18A and the media key 14A must be packaged together in order to work will prevent an unauthorized individual from using a customized peripheral controller 18 to read the encrypted data. The three key scheme works well with fixed disks since the peripheral controller 18 is assumed to be part of the fixed disk media package, never to be separated.

Removable disks may also use one to three keys. However, the use of a controller key 18A with a removable disk is only practical when the removable disk is prepared solely for use with a specific peripheral controller 18. If the removable disk is intended to be used in differing drives, the non-user supplied keys must be media resident. This presents a higher level of risk. However, it is possible to cover the media key 14A with a secondary cover key. This will be a user selectable option during the initialization of the mass storage device 14.

Tapes and CD ROMS may also use one to three keys. The handling rules for these types of mass storage devices 14 are similar to those for the removable disks. However, the use of all three keys make more sense for these types of media since these media are commonly used with specific drives. As stated above, the use of all three keys provide an enhanced level of security protecting against the risk of the media being stolen by an unauthorized user for analysis.

Figure 2:
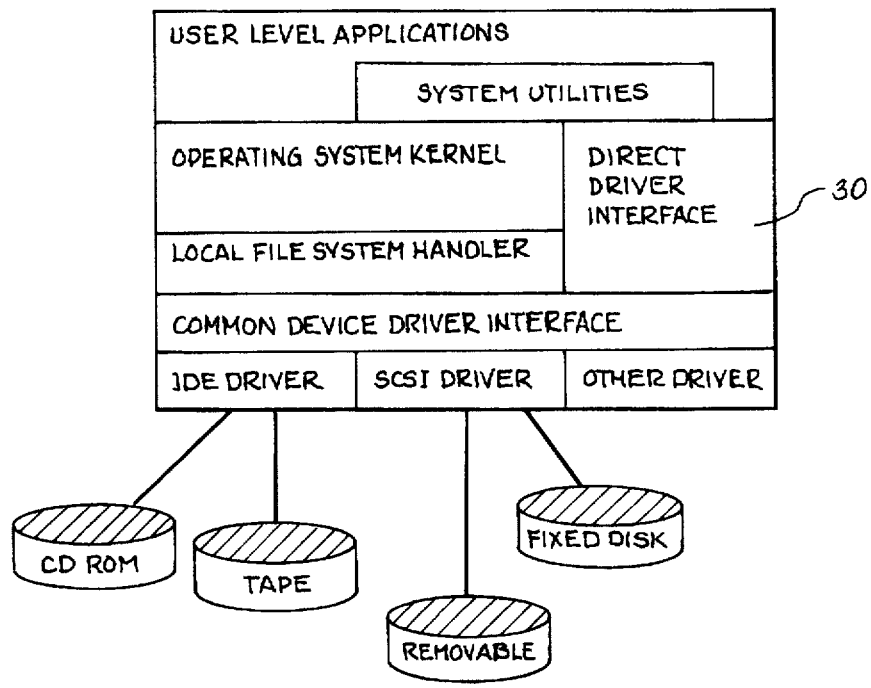
FIG. 2 is a diagram depicting the prior art service layers in a computer system.

Referring now to FIGS. 1A-3, modern computer peripherals like mass storage device 14 share a common trait in that they usually share a common industry standard bus, and they communicate using a standard command set. The flow of I/O control passes through service layers as illustrated in FIG. 2. Of particular importance is the Direct Driver Interface 30. The principle of the Direct Driver Interface 30 is to allow user level application access to specialized hooks in the peripheral device driver for services that are not normally needed by most functionality contained within the operating system. By using the Direct Driver Interface 30, one has the ability to access functionality within the mass storage device 14 that normally would not be available for use.

Figure 3:
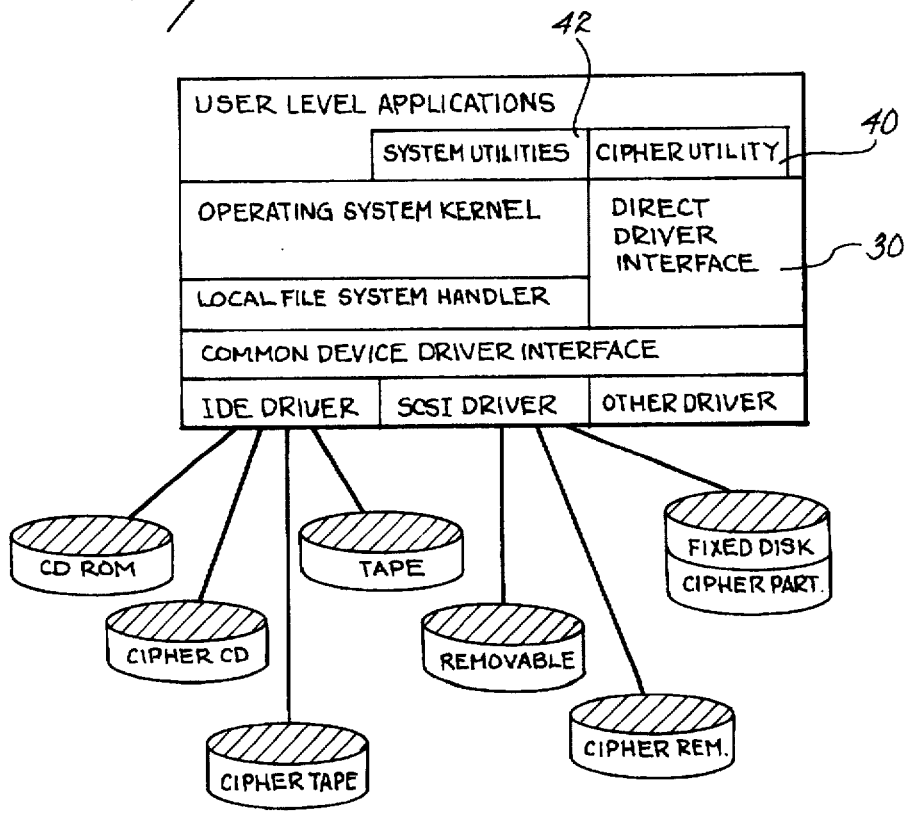
FIG. 3 is a diagram depicting the new service layers in a computer system using the secure mass storage system depicted in FIG. 1.

In order for the system 10 to operate, an extension to the standard peripheral command interface needs to be implemented. As shown in FIG. 3, a cipher control utility 40 has been implemented as part of the system utilities 42. The cipher utility 40 will call peripheral device (i.e. mass storage device 14) command extensions via the direct driver interface 30. The command set extensions will be used for initializing the mass storage device 14 to store encrypted data transferred from the cryptographic device 20, allowing selection of a keyphrase during initialization of the mass storage device 14, and for allowing a user of the system 10 to input the keyphrase to unlock the user supplied key for accessing the encrypted data stored on the mass storage device 14.

COMMAND SET EXTENSIONS

CPU systems 12 containing cipher enabled mass storage devices 14 should function as normally and as transparently as possible without extra operator intervention. Ideally, the secured mass storage devices 14 operate no differently than standard devices unless they are cipher enabled. In which case, the user supplied key 12A must be loaded in order to access the encrypted data.

In most cases, a cipher enabled mass storage device 14 may be added to the CPU system 12 and operate normally without change. However, the premise behind cipher enabled mass storage device 14 is to allow authorized users to input a key in order to access the data contained upon an enabled mass storage device 14. Unauthorized users will not be able to access the encrypted data stored on the mass storage devices 14. The authentication of the user will be carried out via the command set extension which will be described below.

1. Set Keyphrase

Set Keyphrase is called from the Direct Driver Interface 30 during system 10 boot time (or at a media change for the case of a removable disk). The user supplied key is derived from a text string internally and invisibly translated to a numeric key via a one way hash performed inside the peripheral controller 18. The keyphrase should be a lengthy string of at least 64 bytes but suggested not to exceed 512 bytes in length. Ideally, a string of at least 120 bytes is suggested but longer strings do provide more security. Note, the encrypted media will return endless CRC read errors (or an equivalent) unless the keyphrase has been set properly by an authorized user.

2. Cipher Enable

Cipher Enable enables the encrypted media using the hash derived from the user supplied keyphrase. It may be run only once for any given fixed media. In the case of removable media, it may be overwritten by a hard format request which destroys the media content anyway.

The Cipher Enable command will set all or part (depending on the user's request) of the media as an encrypted "partition", which will then be accessed by using separate logical unit numbers to differentiate it from "clear" (non-encrypted) data. This will then appear to the user as a separate volume. For example, on a fixed disk media having a MICROSOFT operating system, the C: drive may be split into C: and D: volumes with D: being a cipher enabled volume. It should be noted that for removable media, the selection of a controller keyed volume will be an option.

3. Cipher Detect

Cipher Detect is called at volume mount time in order to detect the presence of a cipher-enabled volume. Cipher Detect returns a boolean value indicating the presence of the cipher enabled volume, thus requiring the host system to prompt for the keyphrase.

While the invention has been particularly shown and described with reference to a preferred embodiment thereof, it should be understood by those skilled in the art that changes in form and detail may be made therein without departing from the spirit and scope of the invention.

What is claimed is:

1. A secure mass storage system comprising, in combination:

a Central Processing Unit (CPU) system;

mass storage means coupled to said CPU system for storing and transferring encrypted and non-encrypted data to and from said CPU system;

peripheral control logic means coupled to said mass storage means for reading said encrypted and non-encrypted data stored on said mass storage means;

peripheral controller means coupled to said peripheral control logic means for accessing said mass storage means;

cryptographic means coupled to said peripheral controller means for encrypting data to be stored on said mass storage means and for decrypting encrypted data stored on said mass storage means to be used by said CPU system;

bus controller means coupled to said peripheral controller means and to said CPU system for selecting a bus for transferring said encrypted and non-encrypted data to and from said mass storage means;

operating system means programmably stored in said CPU system for providing a command set for operation of said CPU system; user supplied key means programmably stored in said operating system means for accessing said encrypted data stored on said mass storage means; and cipher utility means programmably stored in said operating system means for providing a command set extension to said command set of said operating system means for initializing said mass storage means to store encrypted data transferred from said cryptographic means, allowing selection of a keyphrase during initialization of said mass storage means, and for allowing a user of said system to input said keyphrase to unlock said user supplied key means for accessing said encrypted data stored on said mass storage means.

2. A secure mass storage system in accordance with claim 1 wherein said operating system further comprises direct drive interface means stored in said operating system means for accessing said command set extension.

3. A secure mass storage system in accordance with claim 1 wherein said keyphrase is at least 64 bytes in length.

4. A secure mass storage system in accordance with claim 1 wherein said mass storage means is selected from the group consisting of: fixed disks, removable disks, tapes, compact disks, flash memories, opticals, and combinations thereof.

5. A secure mass storage system in accordance with claim 1 wherein said user supplied key means further comprises public key authentication means programmably stored within said operating system means for allowing multiple users to unlock said user supplied key means for accessing said encrypted data stored on said mass storage means.

6. A secure mass storage system in accordance with claim 1 further comprising commercial key escrow means programmably stored in said cipher utility means to allow an owner of said system to bypass said user supplied key means to access said encrypted data stored on said media storage means.

7. A secure mass storage system in accordance with claim 1 further comprising:

media key means stored on said mass storage means for securing said encrypted data stored on said mass storage means; and controller key means stored on said peripheral controller means for allowing said peripheral controller to unlock said media key means and to read said encrypted data stored on said mass storage means after said keyphrase is verified by said peripheral control means.

8. A secure mass storage system in accordance with claim 7 wherein said mass storage means is selected from the group consisting of: fixed disks, removable disk, tapes, compact disks, flash memories, opticals, and combinations thereof.

9. A secure mass storage system in accordance with claim 7 further comprising commercial key escrow means programmably stored in said cipher utility means to allow an owner of said system to bypass said user supplied key means, said media key means and said controller key means to access said encrypted data stored on said media storage means.

10. A secure mass storage system comprising, in combination:

a CPU system;

mass storage means coupled to said CPU system for storing and transferring encrypted and non-encrypted data to and from said CPU system;

peripheral control logic means coupled to said mass storage means for reading said encrypted and non-encrypted data stored on said mass storage means;

peripheral controller means coupled to said peripheral control logic means for accessing said mass storage means;

cryptographic means coupled to said peripheral controller means for encrypting data to be stored on said mass storage means and for decrypting encrypted data stored on said mass storage means to be used by said CPU system;

bus controller means coupled to said peripheral controller means and to said CPU system for selecting a bus for transferring said encrypted and non-encrypted data to and from said mass storage means;

operating system means programmably stored in said CPU system for providing a command set for operation of said CPU system;

user supplied key means programmably stored in said operating system means for accessing said encrypted data stored on said mass storage means;

cipher utility means programmably stored in said operating system means for providing a command set extension to said command set of said operating system means for initializing said mass storage means to store encrypted data transferred from said cryptographic means, allowing selection of a keyphrase during initialization of said mass storage means, and for allowing a user of said system to input said keyphrase to unlock said user supplied key means for accessing said encrypted data stored on said mass storage means;

direct drive interface means stored in said operating system means for accessing said command set extension;

media key means stored on said mass storage means for securing said encrypted data stored on said mass storage means; and controller key means stored on said peripheral controller means for allowing said peripheral controller to unlock said media key means and to read said encrypted data stored on said mass storage means after said keyphrase is verified by said CPU system.

11. A secure mass storage system in accordance with claim 10 wherein said mass storage means is selected from the group consisting of: fixed disks, removable disks, tapes, compact disks, and combinations thereof.

12. A secure mass storage system in accordance with claim 10 wherein said user supplied key means further comprises public key authentication means programmably stored within said operating system means for allowing multiple users to unlock said user supplied key means for accessing encrypted data stored on said mass storage means.

13. A secure mass storage system in accordance with claim 10 further comprising commercial key escrow means programmably stored in said cipher utility means to allow an owner of said system to bypass said user supplied key means, said media key means and said controller key means to access said encrypted data stored on said media storage means.

14. A method for providing a secure mass storage system comprising the steps of:

providing a secure mass storage system comprising, in combination:

a CPU system;

mass storage means coupled to said CPU system for storing and transferring encrypted and non-encrypted data to and from said CPU system;

peripheral control logic means coupled to said mass storage means for reading said encrypted and non-encrypted data stored on said mass storage means;

peripheral controller means coupled to said peripheral control logic means for accessing said mass storage means;

cryptographic means coupled to said peripheral controller means for encrypting data to be stored on said mass storage means and for decrypting encrypted data stored on said mass storage means to be used by said CPU system;

bus controller means coupled to said peripheral controller means and to said CPU system for selecting a bus for transferring said encrypted and non-encrypted data to and from said mass storage means;

operating system means stored in said CPU system for providing a command set for operation of said CPU system; and user supplied key means programmably stored in said operating system means for accessing said encrypted data stored on said mass storage means;

programming cipher utility means stored in said operating system means for providing a command set extension to said command set of said operating system means for initializing said mass storage means to store encrypted data transferred from said cryptographic means, allowing selection of a keyphrase during initialization of said mass storage means, and for allowing a user of said system to input said keyphrase to unlock said user supplied key means for accessing said encrypted data stored on said mass storage means; and selecting a keyphrase during initialization of said mass storage means.

15. The method of claim 14 wherein said step of providing a secure mass storage system further comprises the step of providing direct drive interface means stored in said operating system means for accessing said command set extension.

16. The method of claim 14 wherein said step of providing a mass storage means further comprises the step of selecting a mass storage means selected from the group consisting of: fixed disks, removable disks, tapes, compact disks, and combinations thereof.

17. The method of claim 14 wherein said step of providing user supplied key means further comprises the step of providing public key authentication means programmably stored within said operating system means for allowing multiple users to unlock said user supplied key means for accessing encrypted data stored on said mass storage means.

18. A secure mass storage system in accordance with claim 14 wherein said step of providing a secure mass storage system further comprises the steps of:

providing media key means stored on said mass storage means for securing said encrypted data stored on said mass storage means; and providing controller key means stored on said peripheral controller means for allowing said peripheral controller to unlock said media key means and to read said encrypted data stored on said mass storage means after said keyphrase is verified by said peripheral controller means.

19. The method of claim 18 further comprising the step of programming commercial key escrow means stored in said cipher utility means to allow an owner of said system to bypass said user supplied key means, said media key means and said controller key means to access said encrypted data stored on said media storage means.

* * * * *